United States Patent [19]
Lau

[11] Patent Number: 5,925,950
[45] Date of Patent: Jul. 20, 1999

[54] ROTATION DETECTOR

[75] Inventor: James Ching Sik Lau, North Point, The Hong Kong Special Administrative Region of the People's Republic of China

[73] Assignee: Johnson Electric S.A., Chaux-de-Fonds, Switzerland

[21] Appl. No.: 09/009,123

[22] Filed: Jan. 20, 1998

[30] Foreign Application Priority Data

Jan. 24, 1997 [GB] United Kingdom .................... 9701538

[51] Int. Cl.⁶ ........................... H02K 29/12; H02K 29/14
[52] U.S. Cl. ............................................. 310/68 B; 310/89
[58] Field of Search .................................. 310/68 B, 89, 310/152, 154, 155

[56] References Cited

U.S. PATENT DOCUMENTS

| | | | |
|---|---|---|---|
| 4,082,968 | 4/1978 | Jones | 310/68 B |
| 4,138,642 | 2/1979 | Mohr | 324/158 MG |
| 4,914,713 | 4/1990 | Mueller et al. | 310/68 B |
| 5,057,727 | 10/1991 | Jones | 310/68 B |
| 5,329,195 | 7/1994 | Horber et al. | 310/68 B |

FOREIGN PATENT DOCUMENTS

| | | | |
|---|---|---|---|
| 0626748 | 11/1994 | European Pat. Off. | H02K 23/66 |
| 0529131 | 10/1995 | European Pat. Off. | |
| 2022326 | 12/1979 | United Kingdom | H02K 11/00 |

*Primary Examiner*—Nestor Ramirez
*Assistant Examiner*—Burton S. Mullins
*Attorney, Agent, or Firm*—Birch, Stewart, Kolasch, and Birch, L.L.P.

[57] ABSTRACT

A rotation detector for a miniature permanent magnet d.c. motor comprises an induction coil wound around a flux ring for the motor. The flux ring has a stepped portion accommodating the windings of the coil. The coil produces electrical signals in response to changes in the magnetic field of the stator caused by rotation of the rotor.

16 Claims, 2 Drawing Sheets

ROTATION DETECTOR

BACKGROUND OF THE INVENTION

This invention relates to a rotation detector for use with an electric motor and in particular, to a rotation detector for a miniature permanent magnet direct current (PMDC) motor.

Many applications of PMDC motors require the speed of the motor to be monitored or the number of revolutions made by the motor shaft to be counted. This is often achieved using a Hall sensor and a magnet fitted to the shaft or by using an encoder fitted to the shaft in co-operation with an optical sensor. Both of these methods involve relatively expensive parts, are time consuming to fit and require the motor to be designed to accommodate these parts as they occupy a significant amount of space either inside the motor, increasing the size of the motor or outside the motor where they are vulnerable to damage.

Recently, rotation detectors which use an induction coil to monitor changes in the magnetic flux of the motor as the rotor rotates have been developed, see for example, EP-A-0626748 in which an inductor/capacitor circuit fitted into a separate case which is fitted to the non-drive end of the motor by being press fitted to the bearing boss. In this arrangement, the coil is detecting leakage flux and for efficient motors, it is hoped that flux leakage is minimised to increase efficiency, reducing the reliability/sensitivity of this type of detector. See also EP-A-0529131 which uses a coil mounted within the motor.

SUMMARY OF THE INVENTION

To provide a sensitive detector, the rotation detector according to the present invention uses an induction coil wound around a magnetic flux conducting means adapted to provide a flux return path for the stator of the motor. Ideally, this magnetic flux conducting means is a flux ring fitted to the motor casing or alternatively, it may be a part of the motor casing. Flux rings are commonly used to provide a low resistance magnetic flux return path between the magnetic poles of the stator, Use of a flux ring helps to concentrate the magnetic flux and reduce flux leakage while allowing the motor casing to be made of thinner material without risking saturation of the magnetic path. By winding the induction coil around the flux ring, the flux ring acts as a core for the coil, simplifying forming of the coil while assuring that the magnetic flux passes through the coil, giving a strong signal to the rotation detection circuit. At the same time, the flux ring embodiment allows the motor to be changed without affecting the detection circuit. Indeed, the rotation detector can be fitted to any motor by suitable adaptation of the flux ring and does not require any particular features to be built into the motor.

The aim of the invention is to provide a novel rotation detector for a permanent magnet direct current motor using an induction coil.

As rotation detection circuits are well known and do not form a part of this invention, they will not be described although it should be remembered that the signal from the detector is fed to the detection circuit which will use this signal to achieve its designed function which may include speed control, position control, overload detection and fault conditions such as obstructed operation.

Accordingly, the present invention provides a rotation detector for use with a direct current motor having a casing housing a permanent magnet stator, the detector comprising: magnetic flux conducting means adapted to provide a flux return path for the stator; and detector means including a coil wound around the magnetic flux conducting means whereby changes in the magnetic flux of the motor generates an electrical signal in the coil.

Preferably, the magnetic flux conducting means is adapted to engage the casing of the motor.

Alternatively, the magnetic flux conducting means may be at least a part of the casing of the motor.

Preferably, the magnetic flux conducting means is fitted to a printed circuit board and the coil is terminated on terminals of the printed circuit board and the printed circuit board has male terminals arranged to mate with female terminals of the motor.

Preferably, the printed circuit board has circuitry for interpreting the signals from the coil and for controlling the motor in response to those signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Preferred embodiments of the invention will now be described, by way of example only, with reference to the accompanying drawings in which are given by way of illustration only, and thus are not limitative of the present invention, and wherein.

DESCRIPTION OF THE PREFERRED EMBODIMENTS

Figure 1:
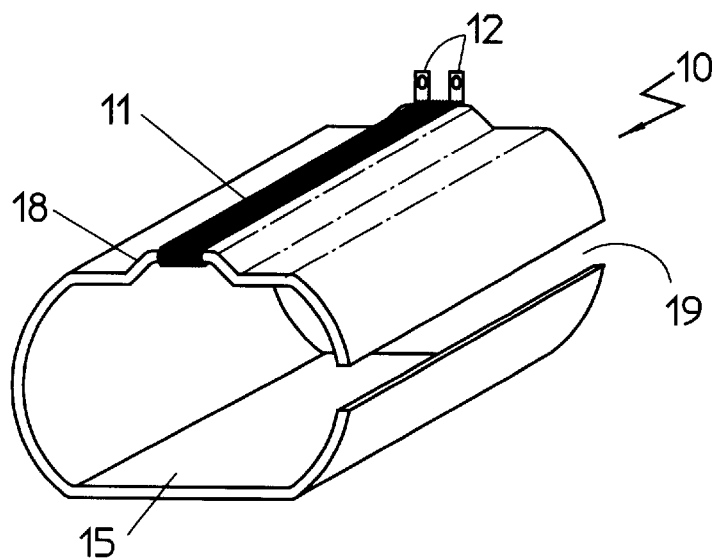
FIG. 1 depicts a rotation detector according to a first embodiment.
Figure 2:
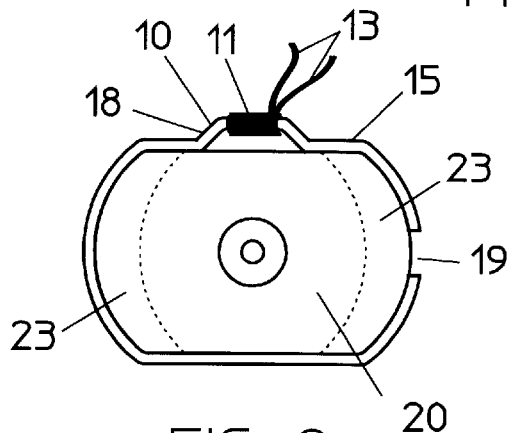
FIG. 2 depicts the rotation detector of FIG. 1 fitted to a flat sided motor.

In the rotation detector 10 of the first embodiment, shown in FIGS. 1 and 2, the magnetic flux conducting means is a flux ring 15 and the coil 11 is wound around the flux ring. The flux ring 15 is of the full shell type, meaning that the ring substantially surrounds the motor casing 22 in use. In practise, the inner diameter of the flux ring in its relaxed state is smaller than the diameter of the motor casing so that the flux ring 15 is stretched to fit the motor casing 22 with the resilience of the ring utilised to secure the ring to the motor. Additional detents may be provided. The shape of the ring substantially matches the shape of the motor casing to give a good contact between the casing and the ring to minimise the resistance of the magnetic flux path.

The motor 20 shown is a flat sided motor meaning that the casing 22 has two arcuate, or part circular, portions connected by two straight portions, the straight portions being parallel to each other. The stator has two arcuate permanent magnets 23 fitted to the circular portions of the casing 22. The flux ring 15 is of a similar shape with a split 19 at a position corresponding to a plane passing through the poles of the stator magnets. The coil 11 is wound at the straight portions. This is where the magnetic flux concentration is greatest during use. The flux ring 15 is deformed to provide a stepped portion 18 at the position where the coil 11 is wound to produce a space or clearance between the flux ring 15 and the motor casing 22 for the coil as the flux ring is otherwise contiguous with the motor casing. The coil 11 may be terminated on terminals 12 fitted to the flux ring 15 as shown in FIG. 1 or it may have fly leads 13 as shown in FIG. 2 for connecting directly to the detection circuitry.

Figure 3:
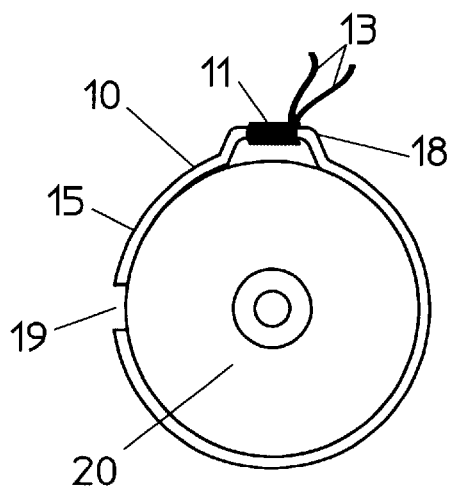
FIG. 3 is the view similar to FIG. 2 of a rotation detector fitted to a round motor.

FIG. 3 depicts a similar rotation detector 10 fitted to a round motor 20 (a motor with a casing having a circular cross-section). Detents (not shown) ensure that the flux ring 15 (also with a substantially circular cross-section) is fitted to the motor casing 22 with the split 19 aligned with a plane passing through the magnetic poles of the stator and the coil 11 is positioned on a stepped portion 18 between two adjacent poles of the stator. Such motors generally have two individual arcuate permanent magnets or a rubber ring magnet formed with two or more poles.

Figure 4:
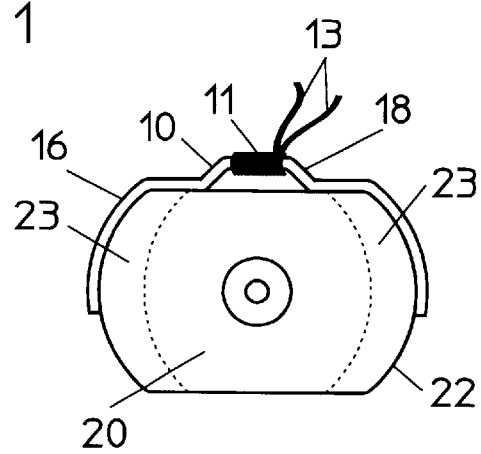
FIG. 4 depicts a rotation detector according to another embodiment fitted to a motor.

FIG. 4 shows a rotation detector 10 similar in construction to the rotation detector of FIGS. 1 and 2, fitted to a flat sided motor 20 with the variation that the magnetic flux conducting means is a half shell flux ring 16 meaning that the flux ring 16 extends circumferentially about the motor casing 22 only about half way. In practice, the flux ring 16 extends slightly more than half way in order to provide a self-supporting grip on the casing. In all other respects, the detector is the same as the embodiment of FIG. 1.

Figure 5:
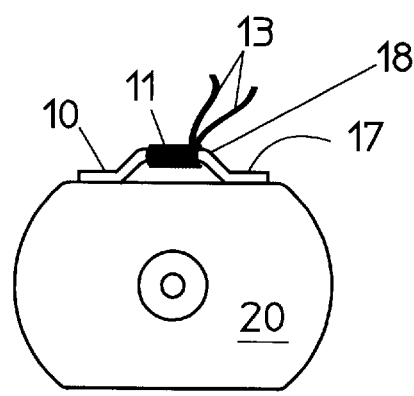
FIG. 5 depicts a rotation detector according to an alternate embodiment fitted to a motor.

FIG. 5 is a similar view to FIGS. 2 and 4 of a rotation detector 10 incorporating magnetic flux conducting means in the form of a flux ring 17 of the quarter shell type. The quarter shell flux ring 17 extends between magnets along the flat side of the motor casing and supplements the flux path provided by the casing 22. Again, the flux ring 17 has a stepped portion 18 at a position between the poles or the magnets to accommodate the coil winding.

Figure 6:
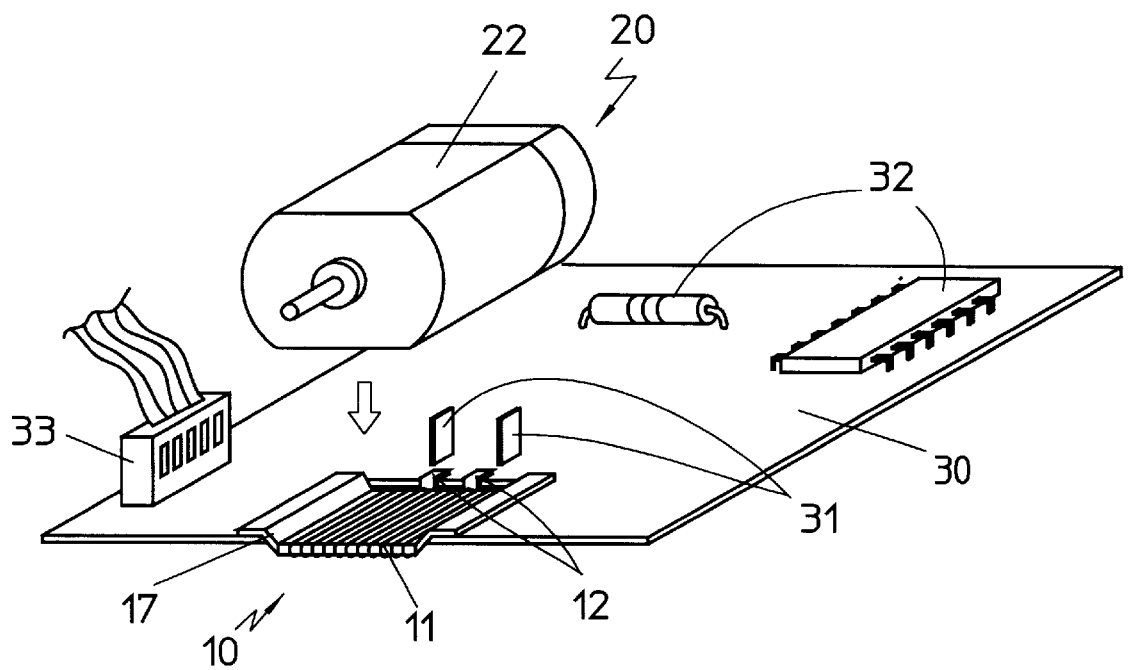
FIG. 6 depicts the rotation detector of FIG. 5 fitted to a printed circuit board.

The quarter shell flux ring 17 allows interesting mounting arrangements such as the arrangement shown in FIG. 6 where the flux ring 17 is fitted to a printed circuit board (PCB) 30. The PCB 30 has a connector 33 for connecting the board 30 to a power supply for the motor and for control signals for operating the motor. The PCB 30 also has electronic circuitry 32 for interpreting signals from the rotation detector 10 and for controlling the motor 20 in response to the signals from the rotation detector and the input control signals. The control signals may be simple on/off signals or may be more complicated including specifying the condition to be maintained, e.g., speed or position. In the embodiment shown, the motor has female terminals (not visible) and the PCB 30 has male terminals 31 for mating with the female terminals of the motor. The male terminals 31 also provide locating assistance and supporting assistance although in most applications, additional support for holding the motor 20 to the flux ring 17 and/or PCB 30 would be required to prevent accidental displacement of the motor with respect to the PCB due to vibration, knocks, etc.

While a flat sided motor has been shown, the quarter shell flux ring may be used with a round motor with care taken to ensure correct alignment of the flux ring with the poles of the stator.

Figure 7:
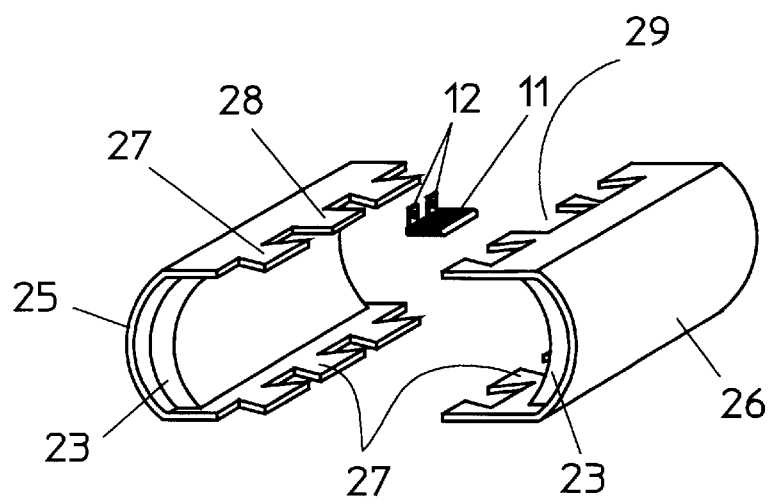
FIG. 7 depicts a rotation detector according to yet another embodiment.

The embodiment of FIG. 7 dispenses with the separate flux ring and uses the motor casing 22 as the magnetic flux conducting means. The casing 22 which is of the flat sided type is made in two halves 25, 26 and is known colloquially as a clam shell casing. The two halves 25, 26 are joined together by dovetail connections 27. The connections 27 are formed along the straight sides of the casing and are located between the pair of magnets 23 forming the stator. Each half accommodates a single arcuate magnet.

One of the connections has a straight finger 28 on the first half 25 which is received in a cut-out 29 in the other half 26. About this finger 28, the induction coil 11 is wound or placed to monitor changes in the magnetic field as the rotor rotates. While the coil 11 may be bobbin wound which would help to support coil terminals 12, it is preferably epoxy or resin encapsulated providing a robust, stable and insulated coil of minimal dimensions.

As an alternative, the motor casing could be a deep drawn can with the finger being a cut and raised portion which is fitted with the coil and bent or deformed back into the recess formed by the creation of the finger with the distal end of the finger abutting or closely adjacent to the edge of the recess from which it was cut to minimise the resistance of the flux path through the finger.

While various preferred embodiments have been described, it will be appreciate by those skilled in the art that modifications and changes may be made to the embodiments described without departing from the spirit and the scope of the invention as defined by the appended claims.

I claim:

1. A rotation detector for use with a direct current motor having a casing housing a permanent magnet stator, the detector comprising:

magnetic flux conducting means adapted to provide a flux return path for the stator, said magnetic flux conducting means being disposed external said casing; and detector means including a coil wound around the magnetic flux conducting means whereby changes in the magnetic flux of the motor generates an electrical signal in the coil.

2. The rotation detector as defined in claim 1, wherein the magnetic flux conducting means is at least a part of the casing of the motor.

3. The rotation detector according to claim 1, wherein the magnetic flux conducting means is adapted to engage the casing of the motor.

4. The rotation detector as defined in claim 3, wherein the magnetic flux conducting means is fitted to a printed circuit board and the printed circuit board has male terminals arranged to mate with female terminals of the motor.

5. The rotation detector according to claim 4, wherein the printed circuit board has circuitry for interpreting the signals from the coil and for controlling the motor in response to said signals.

6. The rotation detector according to claim 1, wherein the magnetic flux conducting means is a flux ring fitted to the motor casing.

7. The rotation detector according to claim 6, wherein the flux ring has a stepped portion to accommodate the coil windings.

8. The rotation detector according to claim 1, wherein the magnetic flux conducting means is a flux ring fitted to at least a portion of the motor casing.

9. The rotation detector according to claim 8, wherein said motor casing is fitted with a coil to monitor a magnetic field.

10. The rotation detector according to claim 1, wherein the magnetic flux conducting means is integrated as part of said casing.

11. The rotation detector according to claim 10, wherein said casing is two halves connectively joinable together.

12. The rotation detector according to claim 11, wherein each of the halves is integrated with a magnet therein.

13. A permanent magnet direct current motor incorporating a rotation detector, the motor comprising:

a permanent magnet stator comprising two arcuate permanent magnets;

a magnetically conductive casing forming a flux return path for the stator and supporting the magnets;

a rotor mounted on a shaft in confronting relationship with the stator;

two end brackets fitted to respective axial ends of the casing and supporting bearings in which the shaft is journalled; and a rotation detector coil, wherein the casing has a first piece and a second piece joined together by interlocking projections, the first piece has a finger which extends across a cutout in the second piece and abuts the second piece, the rotation detector coil being located within the cutout and about the finger whereby changes in the magnetic flux of the motor caused by the rotation of the rotor generates an electrical signal in the coil.

14. The permanent magnet direct motor according to claim 13, wherein said interlocking projections are dovetail connections.

15. The permanent magnet direct motor according to claim 13, wherein said rotation detector coil is bobbin wound.

16. The permanent magnet direct motor according to claim 15, wherein said rotation detector coil is epoxy or resin encapsulated.

* * * * *